United States Patent [19]
Barker

[11] Patent Number: 4,654,832
[45] Date of Patent: Mar. 31, 1987

[54] SONOBUOY RETAINING AND RELEASE APPARATUS

[75] Inventor: Robert L. Barker, Ossian, Ind.

[73] Assignee: Magnavox Government and Industrial Electronics Company, Fort Wayne, Ind.

[21] Appl. No.: 555,978

[22] Filed: Nov. 29, 1983

[51] Int. Cl.$^4$ ............................................. B63B 21/52
[52] U.S. Cl. ......................................... 367/4; 441/33
[58] Field of Search .................. 367/4; 441/7, 24, 25, 441/33; 294/82.25

[56] References Cited

U.S. PATENT DOCUMENTS

| | | | |
|---|---|---|---|
| 3,646,505 | 2/1972 | Kirby | 340/2 |
| 3,825,213 | 7/1974 | Saunders et al. | 244/138 A |
| 3,921,120 | 11/1975 | Widenhofer | 340/2 |
| 4,020,514 | 5/1977 | Bourgeois | 9/8 R |
| 4,029,233 | 6/1977 | Widenhofer | 220/89 A |
| 4,033,529 | 7/1977 | Bourgeois | 367/4 |
| 4,247,143 | 1/1981 | Putman | 294/82.25 |

Primary Examiner—Richard A. Farley
Attorney, Agent, or Firm—Thomas A. Briody; William J. Streeter; Richard T. Seeger

[57] ABSTRACT

Sonobuoy parachute shroud line ends are retained by a cup mounted in and adjacent one end of the sonobuoy outer casing. A heavy ejection spring is beneath the cup for forcibly ejecting the cup outwardly from the one end of the casing. The cup is retained in the casing against the spring force by a pair of partially overlapping elongated plates each having one end releasably inserted in a circumferential slot in the outer casing, the slots being adjacent the casing one end and diametrically opposed. The upper plate is in retentive contact near the other of its ends by a first retainer rod pivoted at one of its ends to the cup bottom surface. The first rod contacts the upper plate near the pivoted rod end and is in retentive contact near its other end with a second retainer rod pivoted at one of its ends to the cup bottom surface. The second rod contacts near its pivoted end the first rod and is in retentive contact at its other end with a one shot spring motor driven pin. The location of the points of contact between the plates, the upper plate and the first rod, the first and second rods and the pin and the second rod provide lever arms that result in a very high mechanical advantage between the retaining force of the pin on the second rod and the ejection spring force. Upon ejection, the cup, parachute, and shroud lines are ejected and other sonobuoy components are released from the outer casing.

10 Claims, 14 Drawing Figures

SONOBUOY RETAINING AND RELEASE APPARATUS

BACKGROUND OF THE INVENTION

1. Field of the Invention

This invention relates to sonobuoy deployment apparatus and more particularly to automatic parachute ejection and communication float deployment.

2. Brief Statement of the Prior Art

Sonobuoys are devices adapted to be dropped by parachute from an aircraft, are equipped with a hydrophone for detecting underwater sounds in an active or passive manner and transducing them to electrical signals and have an automatic radio transmitter for transmitting the detected signals to air and surface craft. The aforedescribed components are all initially contained in a sonobuoy cylindrical outer casing. After the sonobuoy is dropped or launched from the aircraft the parachute is deployed to provide a controlled descent to the water surface, the parachute shroud line ends being releasably attached inside the outer casing. After the sonobuoy enters the water, the shroud line ends are ejected from the casing and a communication float having an antenna, radio frequency transmitter, logic controls, and power supply exits the outer casing and rises to the water surface. The hydrophone is deployed at a controlled depth below the water surface for underwater sound detection.

In one previous system, the shroud line end ejection and float exit are effected by a bendable retaining plate releasably mounted near the casing one end. An inflatable float bag of a flexible material such as a heavy plastic is positioned inside the casing and after the sonobuoy is in the water the bag is inflated as from a pressurized canister. When the bag pressure is sufficiently high, a bending force is applied to the plate causing it to buckle and be ejected from the outer casing, whereupon the shroud line ends are ejected and the bag exits the casing and rises to the water surface. This system is relatively expensive owing to the cost of the inflatable bag and pressurized cartridge, has a relatively low shelf life due to gradual pressure loss from the cartridge, and requires differently sized and/or configured plates and cartridges for different size buoys.

SUMMARY OF THE INVENTION

A parachute cup which holds the shroud line ends is retained against the force of a heavy cup ejection spring in a sonobuoy outer casing near its upper end by a pair of partially overlapping elongated plates, two retainer rods, and a spring motor operated pin. The plates and rods are fulcrumed and have sequential or layered retentive contacts so as to provide several lever systems having a very large overall mechanical advantage. This ejection mechanism is highly reliable and relatively inexpensive. The float is a rigid cylindrical canister further reducing cost and increasing reliability. Upon actuation of the spring motor the cup, shroud lines, plates, rods and pin are forcefully ejected from the outer casing end and the remaining sonobuoy components are released from the outer casing. The spring motor is mounted in the float and is releasably keyed to the pin drive.

The partially overlapping plates each have one end insertable in and pivotally fulcrumed at a respective circumferential slot in the outer casing. The slots are diametrically opposed. A first retainer rod is pivotally fulcrumed at one end to the cup bottom surface and is in retentive contact with the upper plate adjacent the upper plate other end. The second rod is also pivotally fulcrumed at one end to the cup bottom surface and is in retentive contact adjacent its one end with the first rod adjacent the first rod other end.

A pin transversely extends from the end of a shaft rotatably mounted in and extending upright from the cup bottom. As the shaft rotates, the pin is swingable from a first position where it retentively contacts the second rod near its other end to a second position free of the second rod thus permitting the heavy ejection spring to eject the cup, shroud lines, plates, rods, pin and shaft from the outer casing.

A one shot spring motor mounted inside a rigid cylindrical communications float canister which is positioned inwardly of the cup in the outer casing is keyed to and rotatably drives the pin shaft. Upon ejection, the shaft separates from the motor at the keyed connection. After ejection, the float canister exits the outer casing and surfaces to perform its communication functions.

The points of contact between the lower and upper plates, the first rod and upper plate, the second and first rod, and the pin and second rod are designed to provide layered "mouse trap" type mechanical advantage systems having lever arm ratios for a high overall mechanical advantage such that, for example, for 200 pounds of ejection spring force on the cup only a fraction of a pound force is exerted by the pin on the second rod to restrain the 200 pound force of the ejection spring. The retention and ejection mechanism of this invention can be applied to a wide variety of sonobuoy sizes and configurations, is highly reliable in operation, and relatively inexpensive and uses a rigid float canister that is more durable, sturdy, and inexpensive.

It is therefore an object of this invention to provide in a sonobuoy a reliable relatively inexpensive sonobuoy retaining and release mechanism.

Another object is to provide in the apparatus of the previous object a high overall mechanical advantage between the retentive force exerted by the release mechanism and the ejection spring force.

A further object is to provide in the mechanism of the first object an ejection mechanism using a spring force and a rigid float.

Another object is to provide a layered mechanical advantage system of fulcrumed plates and rods to achieve a high overall mechanical advantage.

The above mentioned and other features and objects of this invention and the manner of obtaining them will become more apparent and the invention itself will be best understood by reference to the following description of an embodiment of the invention taken in conjunction with the accompanying drawings.

DESCRIPTION OF A PREFERRED EMBODIMENT

Referring to FIGS. 1-4 a sonobuoy 20 prior to deployment has cylindrically tubular outer casing 22, wind blade 24 at the outside upper end thereof and inside thereof in descending order parachute 26, parachute release mechanism shown generally at 28, cylindrical rigid float canister 30, spring 32, upper compliance cable and hard cable pack 34, electrically conductive lower compliance cable 36, sea anchor 38, lower electronic components and hydrophone container 40 and removable lower end 42. Sonobuoy 20 is dropped or launched from aircraft 24 and blade 24 is wind actuated in conventional manner to deploy parachute 26, having a plurality of shroud lines 46 which are releasably attached inside casing 22 as later described, to provide a controlled descent to the surface of water 48.

After casing 22 enters water 48 parachute 26, parachute shroud lines 46, and parachute cup 50 attached to the lower ends of lines 46 are ejected as later described and the buoyancy force of canister 30 and, optionally, the force of spring 32 causes separation of canister 30 from casing 22. Antenna 52 is automatically extended from canister 30 and extends above the surface of water 48 for transmission of signals from hydrophone 54, which may be in an active or passive sonobuoy as is known in the art.

Canister 30 is connected to upper end of electrically conductive upper compliance cable 56 the lower end of which is connected to the upper end of electrically conductive hard cable 58 the lower end of which is connected to the upper end of lower compliance cable 36. Cables 56, 36 are relatively short and resilient to reduce vibration and shock while cable 58 is longer and is dimensioned to provide the desired depth of hydrophone 54.

The lower end of cable 36 is connected to the top of sea anchor 38 the lower end of which is connected to hydrophone 54. In the deployed condition shown in FIG. 4, casing 22 is free of its previous contents and sinks to the bottom which is facilitated by release of end 42.

Lines 46 must securely support casing 22 in its descent to water 48 and then must be reliably and forcefully ejected clear of casing 22 to provide subsequent unrestricted emergence from casing 22 of the remaining sonobuoy components. The mechanism of this invention for accomplishing these objects will be described in reference to FIGS. 5-13.

Figure 1:
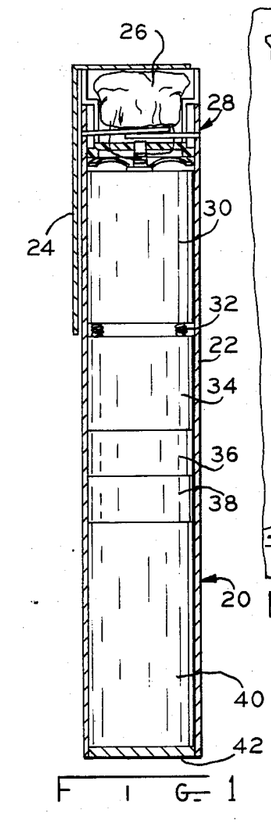
FIG. 1 is a vertical section, shown diagrammatically, of a sonobuoy utilizing the mechanism of this invention.
Figure 2:
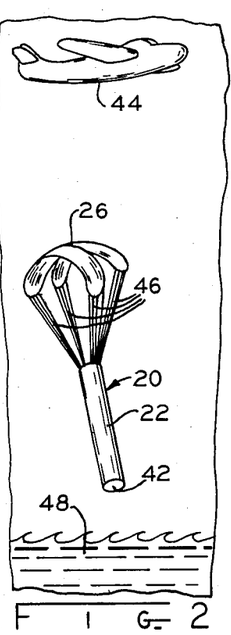
FIG. 2 is a perspective view of a sonobuoy of FIG. 1 with the parachute deployed and about to enter the water after being released from an aircraft.
Figure 3:
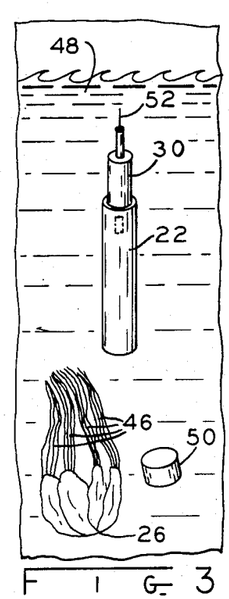
FIG. 3 is a view in perspective of the sonobuoy of FIG. 2 after it has entered the water and the parachute has been ejected by the mechanism of this invention.
Figure 4:
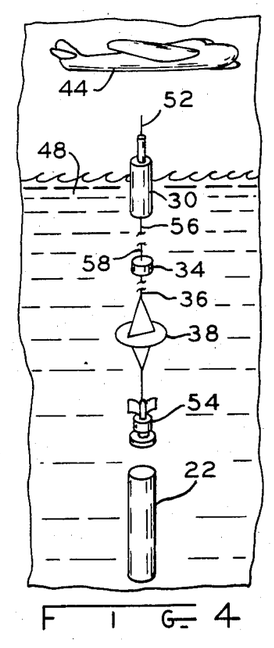
FIG. 4 is a partially broken view in perspective of the sonobuoy of FIG. 3 fully deployed with the outer casing separated and in operation to transmit signals to an aircraft.
Figure 5:
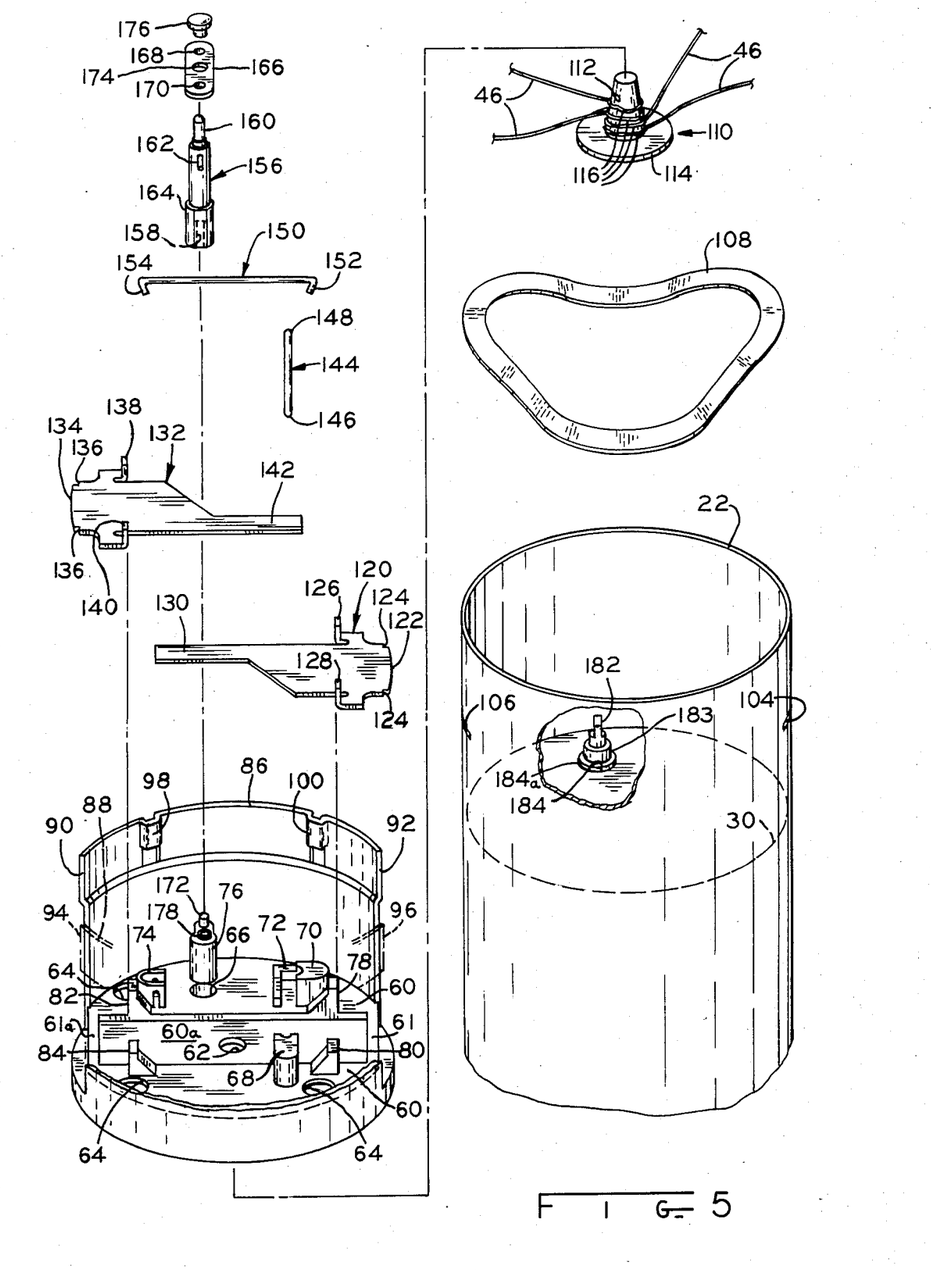
FIG. 5 is an enlarged, partially broken away and partially in phantom, of the linkage of the release mechanism of this invention, the cup supporting the linkage, and the top portion of the sonobuoy outer casing.
Figure 6:
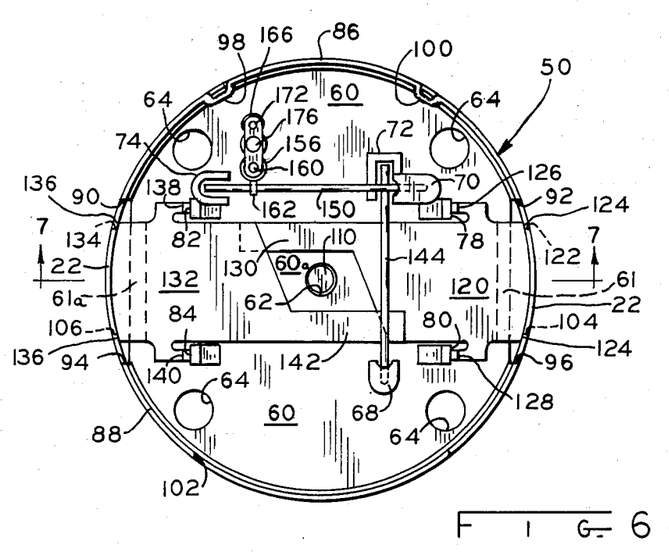
FIG. 6 is a top plan view of the linkage of FIG. 5.
Figure 7:
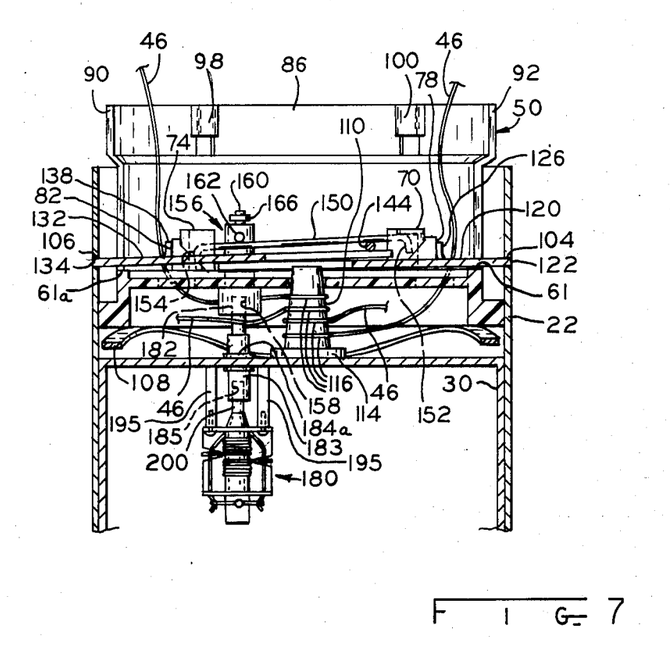
FIG. 7 is a section taken at 7—7 of FIG. 6 and showing the spring motor for actuating the release mechanism linkage.

Referring to FIGS. 5-7 cup 50 which may be of a molded plastic such as ABS plastic or any suitable metal or rigid material has raised bottom 60 having recessed elongated diametral panel 60a bounded at its ends by raised ledges 61, 61a respectively and having centrally located pylon opening 62. Bottom 60 has four circumferentially spaced shroud line openings 64, motor shaft opening 66, and the following elements upstanding therefrom: rod end pivot housings 68, 70 each of which has a slot into which a rod end is inserted to provide limited pivotal movement of a rod, later described; three-walled rod end locators 72, 74; motor shaft support pillar 76; a first pair of plate stops 78, 80 spaced on either side of and adjacent one end of panel 60a; and a second pair of plate stops 82, 84 spaced on either side of and adjacent the opposite end of panel 60a. Cup 50 is slidably mounted in the upper portion of casing 22.

Cup 50 has opposed arcuate wall sections 86, 88 section 86 having vertical edges 90, 92 and section 88, shown in phantom in FIG. 5, having vertical edges 94, 96. Edges 90, 94 are substantially at the corners, respectively, of one end of panel 60a while edges 92, 96 are substantially at the corners, respectively, of the opposite end of panel 60a.

Wall section 86 has circumferentially spaced mounting brackets 98, 100 and wall section 88 has arcuate recess 102. Rigid pneumatically sealed cylindrical float canister 30 is slidably mounted in cylindrical outer casing 22 beneath cup 50. Casing 22 has diametrically opposed circumferential slots 104, 106 near its upper end for purposes later explained. A heavy, e.g. 200 pounds in this embodiment, spring 108 in the form of an undulated washer or ring is placed between cup 50 and canister 30 in casing 22 and held in compression therebetween as later explained. A pylon 110 has transverse hole 112 near its upper end and circular shroud line loop retaining disk 114 at its lower end. Each shroud line 46 has a loop 116 formed at its lower end of a diameter less than the diameter of disk 114. Pylon 110 is inserted through each loop 116 and then inserted through opening 62. A pin, not shown, is inserted through hole 112 during assembly to hold loops 116 on pylon 110, the pin being removed after assembly and prior to use.

In the release mechanism of this invention, a first generally key-shaped plate 120 has arcuate lip 122 at one end thereof which is bounded at either arcuate side by a shoulder 124. Upturned stop fingers 126, 128 are formed on opposite sides of plate 120 and engage stops 78, 80 respectively as will become apparent. Plate 120 is cut away at its other end to form arm 130. A second plate 132 is similarly formed and has lip 134, shoulders 136, fingers 138, 140 which engage stops 82, 84 respectively and arm 142. Plates 120, 132 are preferably of a rigid metallic material. Plate 120 is mounted in cup 50 between edges 92, 96 with lip 122 inserted in slot 104, shoulders 124 abutting the inner wall of casing 22, and fingers 126, 128 slidingly abutting stops 78, 80 respectively. Plate 132 is mounted over plate 120 in cup 150 between edges 90, 94 with lip 134 inserted in slot 106 and shoulders 136 abutting the inner wall of casing 22 and fingers 138, 140 slidingly abutting stops 82, 84, respectively.

Elongated rod 144 has downturned hooked ends 146, 148 and is dimensioned so that end 146 fits into the slot of housing 68 and is restrained from upward movement by the top portion of housing 68 and end 148 fits in locator 72 and is free to move upwardly therefrom when released, as later described, but is restricted from moving longitudinally or laterally of rod 144 by the end and side walls of locator 72 so that end 148 is retained in housing 68 until release. Rod 144 overlays and contacts arm 142 adjacent housing 68, as best seen in FIG. 6. Elongated rod 150 is similar to rod 144 and has downturned hooked ends 152, 154 and is dimensioned so that end 152 fits into the slot of housing 70 and is restrained from upward movement by the top portion of housing 70 and end 154 fits in locator 74 and is free to move upwardly therefrom when released, as later described, but is restricted from moving longitudinally or laterally of rod 150 by the end wall and side walls of locator 74 so that end 152 is retained in housing 70 until release. Rod 150 overlays rod 144 and contacts arm 144 at a point adjacent housing 70 and locator 72 as best seen in FIG. 6. Rods 144, 150 are preferably of a rigid metallic material.

Generally cylindrical elongated motor shaft post 156 has axial keyway 158 formed at one end and cylindrical pivot pin 160 formed at the other end. Laterally extending retaining pin 162 is affixed to post 156 near its upper end and swings about as post 156 is rotated about its axis. The diameter of lower end 164 of post 156 is sized for a rotatably supported fit in hole 66. A support link 166 has openings 168, 170 which receive nub 172, projecting from the top of pillar 76, and pin 160 respectively and center opening 174 which receives headed pin 176. Pin 176 is received in axial hole 178 in the upper end of pillar 76 with a friction fit to securely attach link 166 to pillar 76.

A one shot spring motor 180, FIG. 7, is fixedly mounted in canister 30 near its upper end and is actuated by a sea water activated battery, not shown. Motor shaft extension cylinder 183 has key 182 extending from the upper end and keyway 185 formed in its lower end which receives key 200 at the upper end of the shaft of motor 180. Cylinder 183 extends upwardly through in a pneumatically sealed rotatable mounting in bushing 184a fitted in opening 184 in the upper end of canister 30. Key 182 is axially aligned with and inserted in keyway 158 and rotatably drives post 156. Motor 180 is of a kind disclosed in commonly owned prior filed co-pending application Ser. No. 06/555,517, filed Nov. 28, 1983 by Gerald W. Braun and entitled "Spring Driven One Shot Spring Activated Motor", now U.S. Pat. No. 4,494,024 issued Jan. 15, 1985, the subject matter of which application is incorporated herein by reference. Motor 180 is of a type that, upon actuation, will impart an approximately 135° turn to post 156 to a release position. Other motors of similar function may be used. The retaining or 0° position of post 156 is shown in FIGS. 6 and 7 wherein pin 162 overlies and retains rod 150, as will be more fully explained.

In the assembled or retained position, FIGS. 6 and 7, cup 50 is held inside casing 22 and spring 108 is compressed between canister 30 and the lower surface of cup 50. Spring 108 exerts a large force, in the order of 200 pounds in this embodiment, on the bottom of cup 50. Plate 132 overlies plate 120 and plates 120, 132 are positioned in cup 50 such that fingers 126, 128 abut stops 78, 80 respectively and lip 122 is inserted in slot 24, shoulders 124 abutting the inside surface of casing 22, and lip 134 is inserted in slot 106, shoulders 136 abutting the inside surface of casing 22. Rod 144 overlies and contacts the end of arm 142 and has one end pivotally contained in the slot of housing 68 and the other end restricted from longitudinal and sideways movement in locator 72. Rod 150 overlies and contacts rod 144 adjacent locator 72 and has one end pivotally contained in the slot in housing 70 and the other end restricted from longitudinal and sideways movement in locator 74. Pin 162 overlies and contacts rod 150 adjacent locator 74. Thus pin 162 retains cup 50 in casing 22 since plates 120, 132 are held in position through rods 144, 150 and lips 122, 134 are engaged in slots 104, 106 respectively. It can be seen that a rotation of post 156 in either direction sufficient to swing pin 162 clear of rod 150 will disengage pin 162 from rod 150 and cup 50 will be ejected under the full force of spring 108 from casing 22 since all of the linkage is free to move forcefully upwardly in explosive fashion.

Due to the arrangement of plates 120, 132 rods 144, 150 and pin 162 four mechanical advantages exist and are designated "M.A.1"; "M.A.2"; "M.A.3"; and "M.A.4" respectively. The overall mechanical advantage, or combined four mechanical advantages, is designated "M.A.Overall". Each of the mechanical advantages reduces the retaining force of pin 162 on rod 150 for a given spring 108 force.

Referring to FIGS. 8–13 these mechanical advantages will be described. In this description the capital letter "F" designates "force" and accompanies an arrow indicating the direction of the force. The lower case letter "d" designates "distance" or length between two designated points and is used with dimension lines to designate the points. Numerals following F and d distinguish between different points of force application or measurement. For purposes of illustration, it is assumed that the force directions are perpendicular to the surface of the member on which they act.

Figure 8:
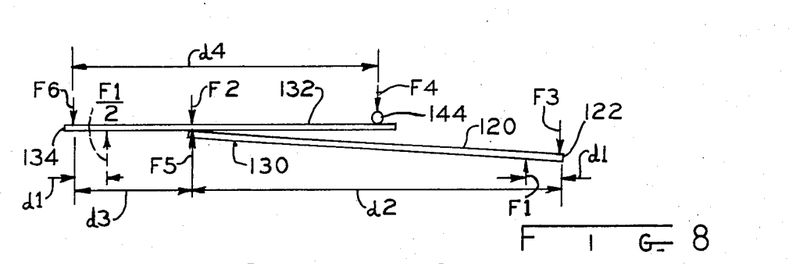
FIG. 8 is a simplified side elevation view of the release mechanism plates showing a vector force diagram of the first set of lever arms.
Figure 9:
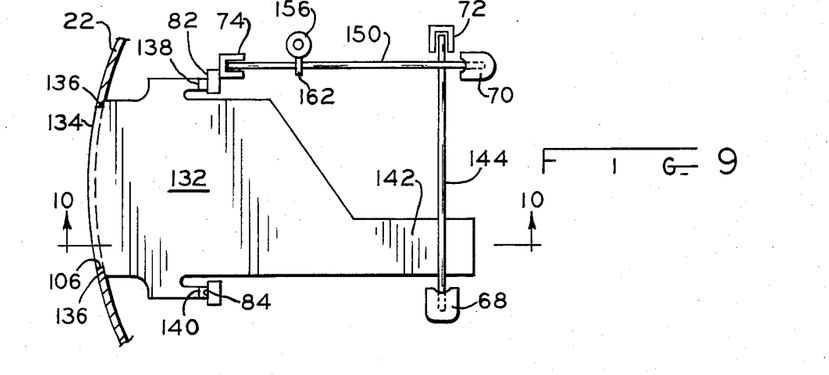
FIG. 9 is a simplified top plan view of one of the plates of FIG. 8, two rods and a release pin of the release mechanism of this invention.
Figure 10:
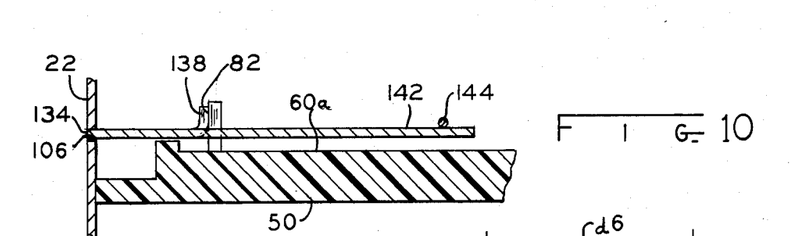
FIG. 10 is a partial section taken at 10—10 of FIG. 9.

In FIG. 8 the free body forces acting on plate 120 are an upward force F1 exerted by ledge 61, a downward force F2 at the end of arm 30 exerted by plate 132 and a downward force F3 exerted by slot 104 on lip 122. d1 is the distance between F1 and F3, and d2 the distance between F2 and F3. By applying the principles of statics involving lever arms and forces, it is seen that F2 in terms of F1, is:

$$F2 = F1(M.A.1)$$

$$M.A.1 = d1/d2$$

Referring to FIGS. 8–12, the free body forces acting on plate 132 are a downward force F4 by rod 144, an upward force F5 (equal and opposite to F2) by the end of arm 130 and a downward force F6 by slot 106 on lip 134. d3 is the distance between F5 and F6 and d4 is the distance between F4 and F6. F4 in terms of F5 is:

$$F4 = F5(M.A.2)$$

$$M.A.2 = d3/d4$$

Figures 11, 12, 13:
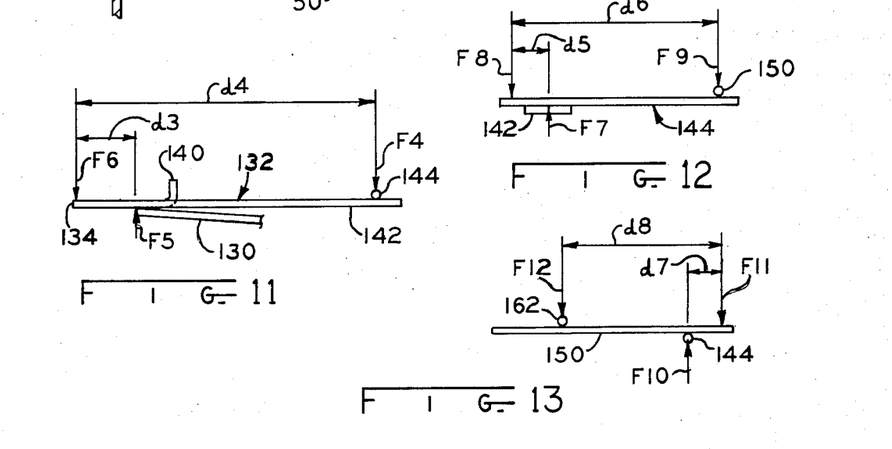
FIG. 11 is a simplified side elevation sectional view of a plate and a first rod of the release mechanism showing the vector force diagram of a second set of lever arms.
FIG. 12 is a simplified side elevation sectional view of the first and second rods of the release mechanism showing a third set of lever arms.
FIG. 13 is a simplified side elevation sectional view of the first and second rods and the release pin of the release mechanism showing a vector force diagram of a fourth set of lever arms.

Referring to FIG. 12 a free body force vector diagram of rod 144 is shown. Upward force F7 is equal and opposite to F4 and is applied by arm 142 to rod 144; downward force F8 is the retaining force applied by housing 68; F9 is a downward force applied by rod 150. d5 is the distance between F7 and F8 and d6 is the distance between F8 and F9. F9 in terms of F7 is:

$$F9 = F7(M.A.3)$$

$$M.A.3 = d5/d6$$

Referring now to FIG. 13, a free body vector force diagram of rod 150 is shown. Upward force F10 is equal and opposite to F9 and is applied to rod 144; F11 is a downward force applied by housing 70; and downward force F12 is applied by pin 162. d7 is the distance between F10 and F11 and d8 is the distance between F11 and F12. F12 in terms of F10 is:

$$F12 = F10(M.A.4)$$

$$M.A.4 = d7/d8$$

The M.A. Overall between the upward force of spring 108 on plate 120 and the upward force on pin 162 is then the product of the four mechanical advantages or:

$$M.A.Overall = (d1/d2)(d3/d4)(d5/d6)(d7/d8)$$

Thus it is seen that the lever systems of M.A.1, M.A.2, M.A.3 and M.A.4 are in series, each lever system increasing the mechanical advantage of the next previous lever system to obtain a substantially high M.A.Overall.

Assume the following distance dimensions (in inches):

$$d1 = 0.28; d2 = 3.28; d3 = 1.3; d4 = 2.8; d5 = 0.125;$$
$$d6 = 1.86; d7 = 0.15; \text{ and } d8 = 1.41.$$

Substituting these values in the M.A.Overall equation obtains an M.A.Overall of 1/3529 or, stated another way, the force on pin 162 is only 1/3529th of the force of spring 108. This is desirable since spring motor 180 size and cost are considerably reduced and reliability, due to the lower forces involved, may be increased as a result. The dimensions d1–d8 may of course be varied and the number of M.A. linkages may be varied to suit a particular purpose.

Other mechanical advantages are possible depending on the configuration and force point locations on the release mechanism of this invention. For example, if we assume in the foregoing illustration that ledge 61a exerts an upward force of (F1)/2, shown by the dashed arrow in FIG. 8, on the underside of plate 132 a distance d1 to the right of F6 and that F1 in FIG. 8 takes the value of (F1)/2, and using the above d1–d8 dimensions, it can be shown using the principles of statics involving lever arms and forces that the M.A.Overall is in the order of 1/2000 or the force on pin 162 is only 1/2000th of the force of spring 108.

In operation, after sonobuoy 20 is immersed in sea water, a sea water activated battery, not shown but well known in the art, actuates motor 180 to rotate post 156 until pin 162 clears rod 150. Rods 150, 144, plates 132, 120 and cup 50 are ejected from casing 22 under the force of spring 108. Pylon 110 becomes free of cup 50 releasing loops 116 and freeing shroud lines 46 and parachute 26. Canister 30 and the other sonobuoy components separate from casing 22, canister 30 rising to the surface of water 48, casing 22 and the ejected parts sinking to the bottom.

Figure 14:
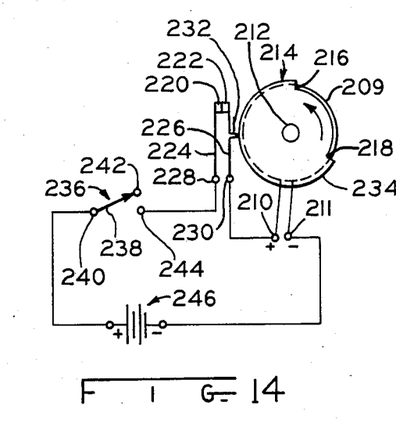
FIG. 14 is a schematic diagram of another motor system for actuating the release mechanism of this invention.

Referring to FIG. 14 another system for rotation of post 156 and pin 162 is shown. DC motor 209 which may be a low rpm motor or geared down to a low rpm has +terminal 210, −terminal 211 and rotatably drives a rotatable shaft 212. Motor 209 is mounted similarly to motor 180 so that shaft 212 is connected to and rotatably drives post 156 and swings pin 162 and rotatably drives limit switch cam 214 which has inwardly formed shoulders 216, 218.

Electrical contacts 220, 222 are at the ends of contact arms 224, 226, respectively which are connected to terminals 228, 230 respectively. Arm 224 is stiff while arm 226 is resilient and is spring loaded so that contact 222 is urged away from contact 220. Arm 226 has cam riding neb 232 that rides the outer surface 234 of cam 214 between shoulders 216, 218 to hold contacts 220, 222 closed. When neb 232 reaches shoulder 216 contacts 220, 222 open to stop motor 209.

Single pole double throw switch 236 has switch blade 238 pivoted at pole 240 and contacts either terminal 242 (off), or 248 (set). Sea water activated battery 246 has its plus terminal connected to motor plus terminal 210 through blade 238, terminal 244 and contacts 220, 222 and its negative terminal connected to motor negative terminal 211.

Shaft 212 is shown in its center position corresponding to the FIG. 6 position of pin 162. Before deployment, blade 238 is preswitched to terminal 244 connecting the negative terminal of battery 246 to negative motor terminal 211 and connecting the positive terminal of battery 246 to positive motor terminal 210 through blade 238, terminal 244 and contacts 220, 222, to impart counterclockwise drive to shaft 212 after battery 246 is immersed until detent 232 registers with shoulder 216 after approximately 95° of counterclockwise rotation whereat contacts 220, 222 open and motor 209 is stopped at which position pin 162 no longer retains rod 150.

It is understood other systems for moving pin 162 to release rod 150 may be used depending on particular sonobuoy use. For example, pin 162 may be solenoid operated for transverse movement clear of rod 150 or pin 162 could be a part of a latch system which is unlatched upon sonobuoy immersion to release rod 150.

Although the invention is described in a passive type sonobuoy embodiment, its use is not so limited. It can for example be used in active type sonobuoys as well as air launched buoys other than sonobuoys. This invention can also be used with buoys other than sonobuoys. This invention can also be used with buoys having an air descent control means other than the described parachute and can also be used in buoys having other types of surface float means such as for example an inflatable surface float. In addition, this invention may be actuated by any desired type of drive motor.

While there have been described above the principles of this invention in connection with specific embodiments, it is to be understood that this is by way of example and is not limiting of the scope of this invention.

What is claimed is:

1. Apparatus for use in a sonobuoy having a deployable parachute with a plurality of shroud lines, the parachute for controlling aerial descent of the sonobuoy, that improvement comprising:

a generally cylindrical elongated outer casing having an axis and having first and second ends;

first means mounted in and for ejection from the outer casing adjacent said first end for holding the parachute shroud line ends in the outer casing;

second means releasably mounted in said sonobuoy outer casing inwardly of said first means for buoyantly containing sonobuoy communication components for communicating sonobuoy signals to a remote station; said second means comprising a pneumatically sealed rigid canister;

third means mounted in said casing between said first means and said second means for providing an ejective spring force to said first means;

fourth means coupled to said first means for releasably retaining said first means in the outer casing by applying a retaining force for retaining said first means in said outer casing against the force of said third means;

fifth means coupled to said fourth means for selectively releasing said retaining force of said fourth means so that said first means is ejected under the force of said third means thereby ejecting the shroud line ends from the outer casing and releasing said second means for exit from said outer casing.

2. Apparatus for use in a sonobuoy having a deployable parachute with a plurality of shroud lines, the parachute for controlling aerial descent of the sonobuoy, that improvement comprising:

a generally cylindrical elongated outer casing having an axis and having first and second ends;

first means mounted in and for ejection from the outer casing adjacent said first end for holding the parachute shroud line ends in the outer casing;

second means releasably mounted in said sonobuoy outer casing inwardly of said first means for buoyantly containing sonobuoy communication components for communicating sonobuoy signals to a remote station;

third means mounted in said casing between said first means and said second means for providing an ejective spring force to said first means;

fourth means coupled to said first means for releasably retaining said first means in the outer casing by applying a retaining force for retaining said first means in said outer casing against the force of said third means; said fourth means comprising a plurality of separate levers interacting with one another, so that one lever is in positive retaining relation with a second lever and prevents movement of said second lever;

fifth means coupled to said fourth means for retaining said one lever by applying a positive retaining force to said one lever for preventing movement of said one lever and for selectively releasing said retaining force whereby said first means is ejected under the ejective force of said third means thereby ejecting the shroud line ends from the outer casing and releasing said second means for exit from said outer casing.

3. The apparatus of claim 2 wherein said fourth means provides a mechanical advantage between the ejective spring force of said third means on said first means and said fifth means retaining force so that said fifth means retaining force is a fraction of said third means spring force.

4. The apparatus of claim 3 wherein said fraction is in the order of 1/2000.

5. The apparatus of claim 3 including a first slot in the circumference of said outer casing adjacent said first end;

said first means comprises a parachute cup mounted in and for ejection from the outer casing and in parachute shroud line end retaining position;

said fourth means levers comprise at least a first elongated flat plate having first and second ends positioned inside said outer casing in a plane substantially transverse to the axis of said outer casing; said plate first end being removably insertable into said first slot, said plate being pivotally fulcrumed at said slot; said plate being in force transmitting contact with said cup along a transverse line intermediate said plate first and second ends;

said fourth means levers further comprise at least one elongated retainer rod having first and second ends, said rod first end pivotally fulcrumed to said cup and in force transmitting contact adjacent its first end to said plate adjacent said plate second end.

6. The apparatus of claim 3 including first and second slots in the circumference of said outer casing adjacent said outer casing first end, said slots being substantially diametrically opposite;

said first means comprises a parachute cup mounted in and for ejection from the outer casing and in parachute shroud line end retaining position;

said fourth means levers comprise a first and a second elongated flat plate each having first and second ends and each positioned inside said outer casing in respective planes substantially transverse to said axis of said outer casing, said second plate partially overlapping said first plate;

said first plate first end being removably insertable into said first slot and said second plate first end being removably insertable into said second slot; said first plate first end being pivotally fulcrumed at said first slot and said second plate first end being pivotally fulcrumed at said second slot; said first plate being in force transmitting contact with said cup along a transverse line intermediate said plate first and second ends;

said fourth means levers further comprising a first and second elongated retainer rod, each rod having first and second ends and each first end of said rods being pivotally fulcrumed to said cup; said first rod being in force transmitting contact adjacent its first end to said second plate adjacent said second plate second end;

said second rod being in force transmitting contact with said first rod adjacent said first rod second end and adjacent said second rod first end;

said fifth means comprises an elongated post rotatably mounted to said cup; a pin transversely mounted to said post and swingable as said post rotates from a first position in force transmitting retaining contact with said second rod adjacent said second rod second end to a second position disengaged from said second rod whereby when said pin is in said second position said first and second rods, said first and second plates, and said cup are forcefully ejected from said outer casing by said third means;

a one shot spring motor coupled to said pin for rotating said post and swinging said pin from said first position to said second position; actuating means for selectively actuating said motor to swing said pin from said first position to said second position.

7. The apparatus of claim 6 wherein said first and second plate second ends each have a longitudinally extending finger along one longitudinal edge thereof; said first plate finger being along a transversely opposite edge from said second plate finger.

8. The apparatus of claim 2 wherein said second means comprises a rigid, pneumatically sealed canister.

9. Apparatus for use in a sonobuoy having a deployable parachute with a plurality of shroud lines, the parachute for controlling aerial descent of the sonobuoy, that improvement comprising:

a generally cylindrical elongated outer casing having an axis and having first and second ends;

first means mounted in and for ejection from the outer casing adjacent said first end for holding the parachute shroud line ends in the outer casing;

second means releasably mounted in said sonobuoy outer casing inwardly of said first means for buoyantly containing sonobuoy communication components for communicating sonobuoy signals to a remote station;

third means mounted in said casing between said first means and said second means for providing an ejective spring force to said first means;

fourth means mounted in said casing for retaining said first means in said casing against the ejective force of said third means;

fifth means coupled to said fourth means for releasably applying a retaining force to said fourth means for retaining said first means in said outer casing against the force of said third means;

said fourth means comprising at least one lever system means between the ejective force of said third means and the retaining force of said fifth means for providing an overall mechanical advantage between said retaining force of said fifth means and said ejective force of said third means so that said retaining force of said fifth means is a fraction of said ejective force of said third means.

10. The apparatus of claim 9 wherein said fourth means comprises a plurality of lever systems means coupled to one another, each lever system means having a mechanical advantage, each lever system means mechanical advantage improving the mechanical advantage of the next previous lever system means to obtain a substantially improved overall mechanical advantage.

* * * * *